United States Patent [19]

Beeman et al.

[11] 3,823,273

[45] July 9, 1974

[54] SUBSCRIBER'S TELEPHONE CIRCUIT

[75] Inventors: Robert H. Beeman, River Forest; Robert T. Cleary, Lockport, both of Ill.

[73] Assignee: GTE Automatic Electric Laboratories Incorporated, Northlake, Ill.

[22] Filed: Dec. 17, 1971

[21] Appl. No.: 209,047

[52] U.S. Cl. ........... 179/81 B, 179/81 A, 179/170.8

[51] Int. Cl. ........... H04m 1/60

[58] Field of Search... 179/81 A, 81 B, 81 R, 170.8, 179/170.6, 16 F, 170 NC; 333/28, 18

[56] References Cited

UNITED STATES PATENTS

| | | | |
|---|---|---|---|
| 3,330,912 | 7/1967 | Koseki | 179/81 A |
| 3,440,367 | 4/1969 | Holtz | 179/170 NC |
| 3,462,560 | 8/1969 | Holzman | 179/170 NC |
| 3,592,971 | 7/1971 | Cowpland | 179/81 A |
| 3,602,648 | 8/1971 | Holtz | 179/81 A |
| 3,708,630 | 1/1973 | Matsuda | 179/81 A |
| 3,745,261 | 7/1973 | Friedman | 179/170.8 |

*Primary Examiner*—Kathleen H. Claffy
*Assistant Examiner*—Alan Faber
*Attorney, Agent, or Firm*—Robert J. Black

[57] ABSTRACT

A subscriber's telephone circuit providing automatic attenuation and equalization of both receive and transmit voice circuits in response to variations in loop length. An included voice switch also provides attenuation of the receive path circuitry when the subscriber's circuit is operated in the transmit mode.

11 Claims, 5 Drawing Figures

INVENTORS
ROBERT H. BEEMAN
ROBERT T. CLEARY

BY

AGENT

SUBSCRIBER'S TELEPHONE CIRCUIT

BACKGROUND OF THE INVENTION

1. Field of the Invention

This invention relates to a subscriber's telephone circuit that includes automatic gain control of both transmit and receive portions of the circuitry.

2. Description of the Prior Art

At the present time most subscriber telephone instruments utilized in telecommunication systems employs combinations of coils, transformers and other passive devices to achieve telephone instrument operation. Utilization of such devices as employed in present day telephone sets is undesirable from a standpoint of both size and cost. The principal transmitting units are carbon microphones which are characterized by having high distortion and variations in level and position sensitivity. Furthermore, since active devices are not normally incorporated to provide gain, performance is limited on long loops by attentuation of signals, and on short loops by the impedance mismatches produced by the passive compensation methods employed.

In present telecommunication systems, the problems resulting from transmission losses or distortions that arise from differences in transmission path length are normally met by the use of repeaters that amplify signals and by the use of equalization networks that can compensate for level differences or frequency attenuation resulting from impedance mismatches. However, these techniques are not normally incorporated within the telephone subscriber's units therefore variation in the length of the individual subscriber's loops, i.e., the transmission path between the subscriber and the central office still creates substantial problems. Various solutions to this particular problem have been suggested including the inclusion of an equalizer circuit as part of the voice network of the telephone subscriber's set, similar to that shown in U.S. Pat. No. 2,645,681 issued to E. I. Green.

Suggestions for automatic equalization have included the addition of active circuitry in the form of amplification to successfully compensate for variable loop lengths. Such a unit with equalizing circuits designed to operate with solid state amplifiers included in the telephone subscriber's circuit are disclosed in U.S. Pat. No. 3,602,648 to R. E. Holtz. Other prior art telephone arrangements have included the use of internal amplifiers and individual equalization circuits, but none have made use of the potential inherent in the present state of solid state electronic circuity, including the obvious features of elimination of carbon microphones and integration of gain control equalization and amplification circuits.

SUMMARY OF THE INVENTION

The present invention is a subscriber's telephone circuit designed to successfully employ active elements to provide a telephone substation that automatically compensates for the telephone loop variations between subscriber station and the telephone central office, provides impedance matching and equalization of the voice circuitry included as well as being embodied in circuitry that is readily adaptable to state of the art manufacturing techniques including the utilization of integrated circuitry, thick or thin film techniques and the inclusion of high fidelity transducers.

In the present telephone subscriber's circuit power is derived for the present units from the telephone central office battery which is filtered at the subscriber's telephone by means of a low value resistor and a large capacitor. This arrangement provides a low alternating current impedance which is then brought up to normal impedance value through the use of semiconductor components to place a negative resistance in parallel with the filter. Amplifiers incorporated in this circuit permit the problems resulting from line losses to be overcome and also permit the use of a dynamic rather than carbon microphone. No inductors, transformers or other items are included in the telephone circuitry.

Automatic gain control of both receive and transmit channels of the telephone circuit is provided by sensing the telephone line and controlling the gain of signals transmitted in either channel in accordance with the line current flowing over the telephone line from the central office.

Additionally, side tone is maintained at acceptable levels by means of a voice switching circuit that detects those times at which the telephone subscriber's circuit is being employed in a transmit manner and accordingly reduces the gain in the receive channel to provide an acceptable side tone level. Frequency response and gain are changed to compensate for loop length. The mechanism which senses the loop length is separate from that which accomplishes the adjustment thereby eliminating interaction between compensation and terminal impedance. The circuitry as disclosed is fully compatible with the existing central office transmission equipment and loop systems.

The circuitry shown uses neither coils or transformers and accordingly may be implemented as integrated circuitry using film and monolithic techniques. Furthermore, the sensing of the alternating current terminal impedance of the telephone circuit is determined in such a manner that changes in loop current or length have no effect on the impedance determination. dr

DESCRIPTION OF THE PREFERRED EMBODIMENT

Figure 1:
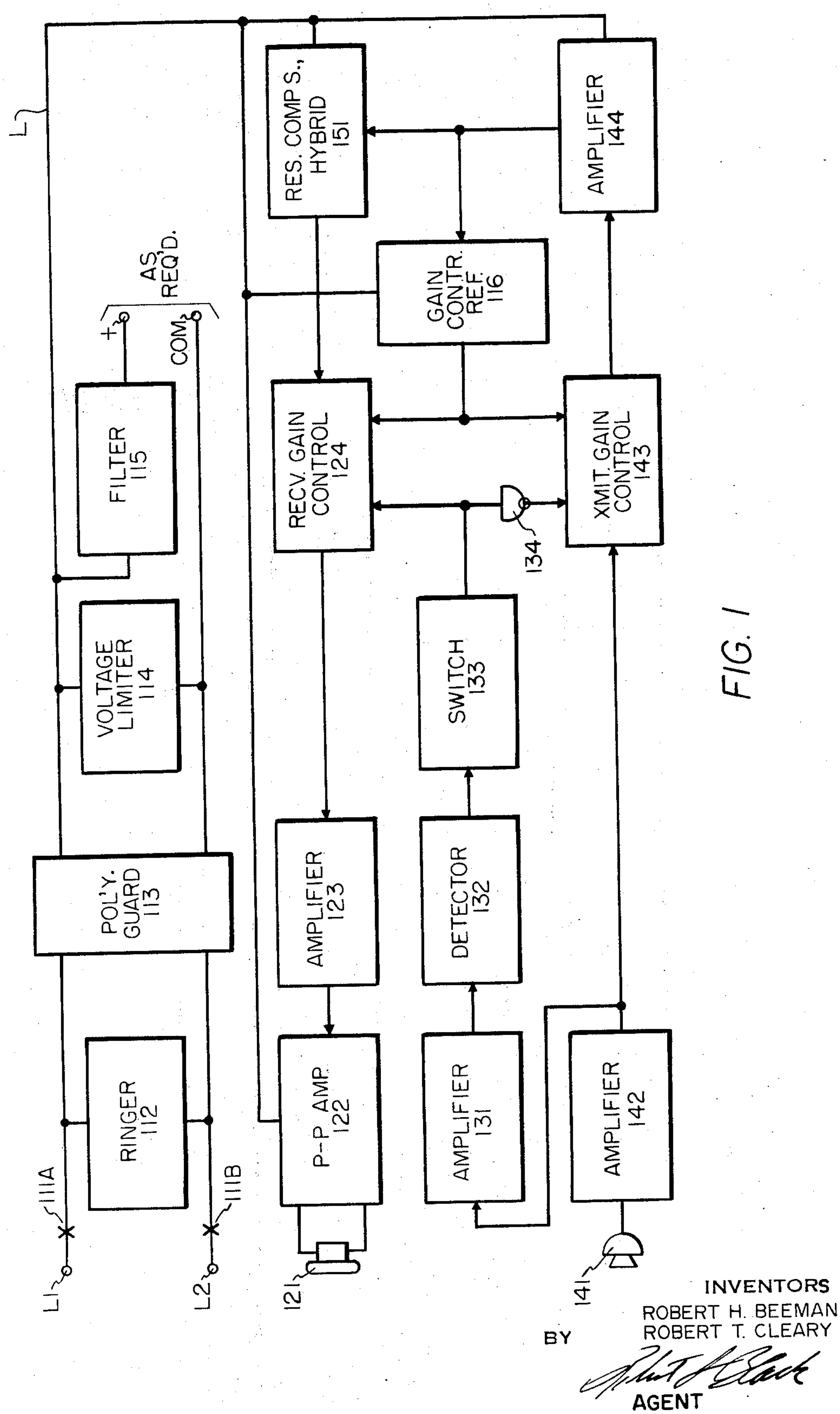
FIG. 1 is a block diagram of a subscriber's telephone circuit in accordance with the present invention.

Referring now to FIG. 1 a block diagram is shown of a subscriber's telephone circuit in accordance with the present invention. Circuitry included therein consists of a line and power supply section, a hybrid circuit, receive channel circuitry, voice switching circuitry, and transmit channel circuitry.

The line and power supply circuitry which is connected to a telephone line extending to a telephone central office, includes a hookswitch including contacts 111A and 111B, a ringer 112, a polarity guard 113, a voltage limiter 114, a filter circuit 115 and a gain control reference circuit 116. The circuit details of all of the above which are included in the line coupling and power supply circuitry are conventional in nature and do not form a part of the present invention. Positive potential derived from the filter 115 and the circuit common or return are distributed to the various subscircuits shown in FIG. 1 as required, and as shown in detail in certain of the circuits contained therein, as shown in FIGS. 2, 3, 4 and 5.

Figure 5:
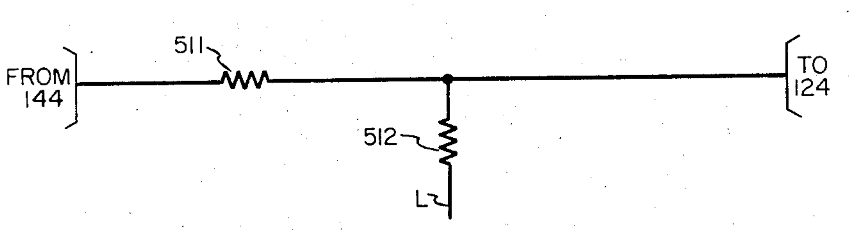
FIG. 5 is a schematic circuit diagram of the resistive components of a hybrid for use in a subscriber's telephone circuit in accordance with the present invention.

The hybrid circuit 151 includes resistive circuit configuration arranged as shown in FIG. 5.

Figure 2:
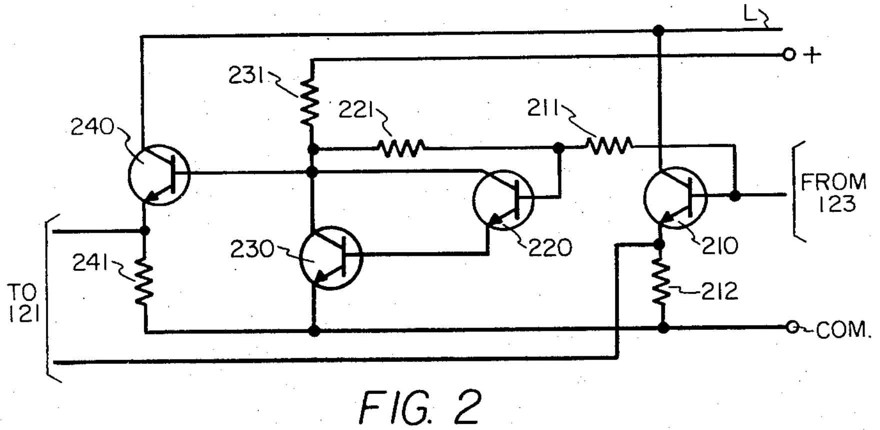
FIG. 2 is a schematic diagram of a push-pull amplifier included in the receive channel of a subscriber's telephone circuit in accordance with the present invention.
Figure 3:
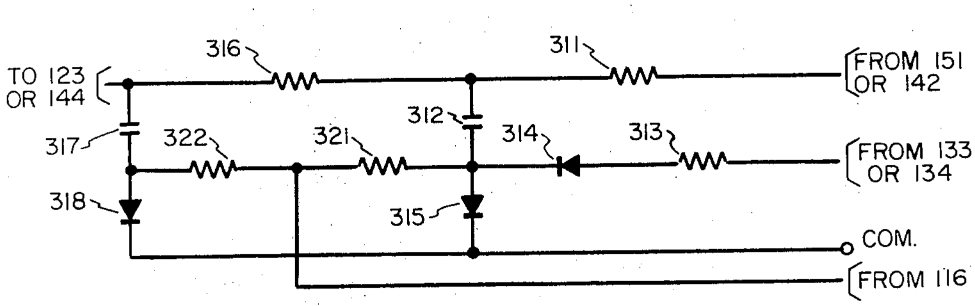
FIG. 3 is a schematic circuit diagram of a gain control circuit as included in both receive and transmit channels of a subscriber's telephone circuit in accordance with the present invention.

The receive channel circuitry includes a receiver 121, a push-pull amplifier 122, amplifier 123 and receiver gain control ccircuit 124. Receiver 121 is a conventional electrodynamic transducer. Other receiver construction would also be compatible with the circuitry of the present invention. The circuitry of push-pull amplifier 122 is shown in detail in FIG. 2 and the detailed circuitry of the receiver gain control circuit 124 is shown in FIG. 3. Amplifier 123 is conventional in design and the circuit details thereof do not form a portion of the present invention.

The voice switch circuitry includes amplifier 131, detector circuit 132, switch circuit 133 and inverter circuit 134. The detailed circuitry of the various sections of the voice switching circuitry is conventional in nature and the details thereof do not form a portion of the present invention.

Figure 4:
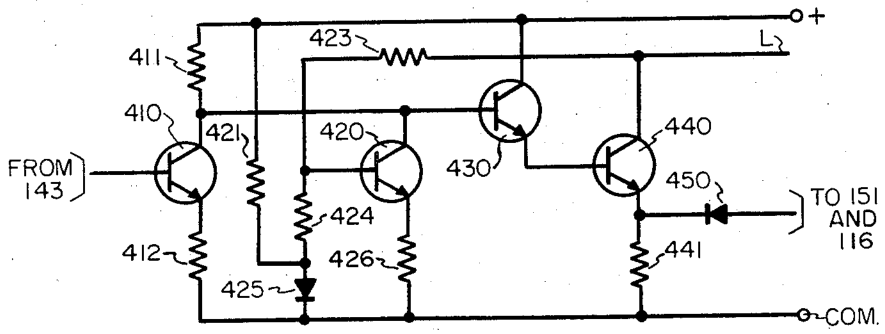
FIG. 4 is a schematic circuit diagram of an impedance correcting amplifier for use in the transmit channel of a subscriber's telephone circuit in accordance with the present invention.

The transmit channel circuitry includes transmitter 141, amplifier 142, transmit gain control circuitry 143 and amplifier 144. The transmitter 141 is a transducer of the electrodynamic type. However other forms of transducers could also be employed. The detailed circuitry of the transmit gain control unit 143 is shown in FIG. 3, while the detailed circuitry of amplifier 144 is shown in FIG. 4. The circuitry of amplifier 142 is conventional in nature and the details thereof are not shown, inasmuch as they do not form a part of the present invention.

An understanding of the present invention may be had by reference to FIGS. 1 through 5 inclusive and the following description.

As shown in FIG. 1 the present subscriber's telephone circuit is connected to a telephone line at terminals designated L1 and L2. The hookswitch consisting of contacts 111A and 111B are included in the leads to the present circuitry, however they do not form part of the present invention, and are shown for illustrative purposes only. Similarly a ringer 112 for signaling of a subscriber at the telephone station is bridged across the line. The details of the ringer likewise do not form a portion of the present invention.

The polarity guard 113 insures that direct current potentials present on the telephone line and extended from the telephone central office are of appropriate polarity to properly operate the included telephone substation circuitry. The polarity guard 113 in the present embodiment consists of a diode bridge configuration. However this is only one of several techniques that might be employed for insuring appropriate polarization of incoming potentials. Across the output of the polarity guard 113, a voltage limiter 114 is connected. In practice this voltage limiter may consist of a zener diode or similar device operated in response to the presence of excessive potential. The telephone line conductors are then connected to the filter circuit 115 where the principal potential utilized in powering the circuitry of the present invention is derived at the terminals marked + and COM. It is to be understood that connections to these terminals are extended to the various subcircuits as required in FIG. 1. The individual connections have not been shown for purposes of convenience. It should also be noted that a lead designated L, is connected to one side of the telephone line before that side is connected to filter 115. This lead forms a portion of the voice signal path for the present circuitry (the return being over the COM terminal), as well as providing unfiltered power to amplifier 122 and 144 and gain control reference circuit 116 of the subscriber's telephone circuit. Unfiltered potential is applied to certain circuit elements of the present invention, because adequate amounts of filtered power cannot be drawn through filter 115, based on the limitations inherent in the filter supply design included in the present embodiment.

Lead L as a conductor of voice signals is connected to hybrid circuit resistive components 151. Referring now to FIG. 5 it will be seen that incoming signals are conducted through resistor 512 directly to the receiver gain control circuit 124 which forms a portion of the receive circuitry, while outgoing signals from amplifier 144 which is included in the transmit channel circuitry, are conducted via lead "L" to the telephone line. Thus as may be seen above, incoming signals from the telephone line are conducted from the telephone line through the polarity guard to hybrid resistive components 151 and then to receive gain control circuit 124, while outgoing signals from amplifier 144 are conducted to the telephone line. The particular hybrid circuitry employed herein while different from that emloyed in conventional telephone subscriber's circuitry, combines the advantages of low cost and nonreactive design, thus permitting fabrication by means of such techniques as integrated circuitry, thick film techniques, etc.

As indicated above incoming signals are directed from hybrid resistive components 151 to the receiver gain control 124 of the receive channel circuitry. The details of the receiver gain control 124 are shown in FIG. 3. Input signals from hybrid resistive components 151 are applied to a voltage divider consisting of resistor 311 as a series element, and capacitor 312 and diode 315 in series forming a shunt element. The voltage on the lead which comes from the gain control reference circuit 116 is applied through resistor 321 to the junction of diode 314, diode 315 and capacitor 312. The current thus developed, through diode 315 varies the dynamic impedance of diode 315 and thus varying the attenuation of this first voltage divider network. In a similar manner the output of the first voltage divider network is applied to a second voltage divider network consisting of resistor 316, capacitor 317 and diode 318. The output of this voltage divider network then appears on the lead to amplifier 123. Attenuation by the second voltage divider is controlled by the voltage on the lead from gain control reference circuit 116, via resistor 322.

It is well known that the small signal AC impedance of a diode is an inverse function of the DC current flow through the diode. This allows a diode to be used, as in this circuit, as a variable resistor controlled by a DC current. In the present circuit, the DC current through the diode is controlled by the voltage applied to resistor 321 or resistor 322 by gain control reference 116. If the value of the capacitor in the shunt arm of the divider is small, the attenuation of the divider will affect high frequencies more than low frequencies. If the capacitor has a high value, the attenuation will be nearly flat over the audio band of frequencies. In the present arrangement capacitor 312 has a large value to control overall gain and capacitor 317 has a small value to control the frequency compensation.

Output signals from the receiver gain control circuit 124 are then applied to amplifier 123 which is of conventional design. Incoming telephone signals which have been directed through the hybrid and the receiver gain control circuit 124 and amplified by amplifier 123 are then applied to the input of push-pull amplifier 122, the detailed circuitry of which is shown in FIG. 2.

Signals from amplifier 123 are applied to the base of transistor 210. These same signals are also applied through resistor 211 to the input of an inverting amplifier (having a gain of 1) consisting of transistors 220 and 230 and their associated feedback resistor 221 and collector resistor 231. The output of the inverting amplifier is presented to the base of transistor 240. Balanced outputs to the telephone receiver 121 are taken from the emitter of transistor 240 and the emitter of transistor 210, which as may be observed are driven in phase opposition.

The balanced configuration present in the push-pull amplifier 122 is utilized at this point because it is necessary that current drawn from the power supply via lead L have no alternating current variation due either to an alternating current voice signal from amplifier 123 or due to voltage variations on lead L. Driving transistor 210 and 240 in phase opposition guarantees that when the collector current of one of the two increases, the collector current of the other transistor will decrease by an equal amount provided that resistor 212 and resistor 241 are of equal value. The current drawn from the power supply via lead L is determined by the direct current level from amplifier 123 and not by the voltage on lead L. This guarantees that amplifier 122 will present a high impedance for alternating current, to the power supply circuitry. As indicated previously receiver transducer 121 is connected to the output of amplifier 122, where audio signals received from the hybrid will be reproduced for utilization by a subscriber.

As noted previously the transmit channel includes transmitter 141 which is of the electrodynamic type. Voice signals spoken by a subscriber and detected by transmitter 141 are applied to the input of conventional amplifier 142. The output of this amplifier is then applied to the input of the transmit gain control unit 143 whose internal circuitry is similar to that of the receiver gain control 124, and consists of the configuration shown in detail in FIG. 3. The operation of this circuitry was described in detail previously in connection with the description of the receive channel. The output from amplifier 142 is also applied to the input of amplifier 131 which forms a portion of the voice switching circuitry which will be described later.

The output of the transmitter gain control circuit 143 is applied to amplifier 144. Amplifier 144 in addition to its function as an amplifying device also functions to correct the terminal impedance of the present telephone subscriber's circuit and acts as a portion of the hybrid circuit whose resistive components are labeled 151. The detailed circuit configuration utilized in amplifier 144 is shown in detail in FIG. 4, where input signals are applied over the lead from transmit gain control unit 143 to the base of transistor 410. Transistor 410 and its associated resistors 411 and 412 form in combination an amplifier. A second amplifier consists of transistor 420, diode 425 and resistors 421, 423, 424 and 426. The input to the second amplifier originates on lead L connected to the telephone line. The output of the two amplifiers is summed in resistor 411 and then applied to the base of transistor 430. Transistor 440 in turn is driven by the emitter current of transistor 430 and produces an output signal on lead L. The gain of the amplifier is established by the value of resistor 441 in in the emitter circuitry of transistor 440. Output is taken from the emitter of transistor 440 through diode 450 and applied to the gain control reference circuit 116 and the hybrid resistive components 151 of FIG. 1. Amplifier 144 serves to correct the impedance of the telephone station circuitry and acts as a portion of the hybrid to apply transmission signals from the output of the transmit gain control circuit 143 of FIG. 1 to the telephone line via lead "L".

Due to the action of filter 115 the impedance of the telephone set is much lower than that normally desired. To raise the impedance to acceptable levels that portion of FIG. 4 consisting of resistors 423 and 424 applies the signal from the line to transistor 420 which inverts this signal, as noted above, summing it with the transmitter signal and applying it to the base of transistor 430. Transistors 430 and 440 again invert and then apply the signal to lead L. Thus the signal taken from lead L and then reapplied to lead L again, raises the output impedance of the telephone to the normally required value. Since the major portion of the telephone loop current flows through the collector-emitter path of transistor 440 and resistor 441, the DC potential present at the cathode of diode 450 is proportional to the current flowing in the telephone loop and therefore may be utilized as a control signal for controlling the gain control circuits 124 and 123, through the gain control reference circuit 116.

Voice signals occurring at the same point (the emitter output of transistor 440) are applied through resistor 511 of hybrid 151, where they act because of their out-of-phase characteristics to inhibit outgoing voice signals from the collector of transistor 440 from entering (via lead L and the hybrid) the receive channel circuitry, thus reducing side-tone level.

As noted previously an output from amplifier 142 is also connected to the input of amplifier 131 which forms a portion of the voice switching circuitry. The voice switching circuitry including amplifier 131, detector 132, switch 133 and inverter 134 act upon receiver gain control circuit 124 and transmitter gain control 143, to vary both the amplitude and equalization of signals in the receive and transmit channels, dependent upon which mode the subscriber station is being operated at any given time.

As noted previously the output of transmitter amplifier 142 is connected to the input of amplifier 131. This amplifier like the remaining circuitry included in the voice switching circuit is conventional in nature. An amplified signal from amplifier 131 is applied to a detector circuit 132. This detector circuit operates in the presence of a signal in excess of a predetermined level to produce an output pulse which is then conducted to switch 133. Switch 133 in response to operation provides operating potential for proper operation of receiver gain control circuit 124. Likewise the output of switch 133 is inverted by inverter 134 and and applied to the transmit control circuit 143. In response to operating potential, as noted previously, the receiver gain control circuit 124 increases the attenuation of signals conducted from hybrid 151 to receiver 121. And conversely inverter circuit 134 decreases the attentuation of signals conducted through the transmit channel from amplifier 142 to amplifier 144. In this manner the sidetone effect of the present subscriber's telephone circuit is substantially reduced.

As noted previously connected to the power supply circuitry of lead L is a gain control reference circuit 116. Signals from amplifier 144 are conducted to this circuit where they are applied to control a conventional voltage follower circuit, where an output is derived that utilizes unfiltered potential derived from lead L to supply controlled DC potential, to both transmit and receive gain control circuits 124 and 143. This potential is proportional to the loop current present through the telephone subscriber's circuit. Thus if the loop current is low because of long loop distances between the present subscriber's circuit and the telephone central office, transmit and receive gain will be increased by virtue of the lower potential signal extended to the gain control circuit 124 and 143, from gain control reference circuit 116. Under short loop conditions, which would provide a higher potential control signal, increased attentuation of signals will be effected by the gain control circuits.

It should be particularly noted when referring to both receive gain control circuit 124 and transmit gain control circuit 143 that the particular circuit to be employed as shown in detail in FIG. 3, provides a combination of both attenuation and equalization. Where a short loop exists between the subscriber station and the telephone central office while the signals are attenuated over all, the amount of attenuation at low frequencies is only slightly less than that at high frequencies. On the other hand in a long loop environment, very little attenuation may take place, but such attenuation as does take place is much greater at low frequency signals than at high frequencies, so as to compensate for the transmission characteristics of the longer loop. Likewise when attenuation of one of the two channels is due to voice switching, attenuation of that channel includes greater attenuation at lower frequencies than higher frequencies.

What is claimed is:

1. A speech network for a telephone circuit comprising: a receiver; a transmitter; a hybrid network connected to a telephone line; a receive channel circuit connected between said receiver and said hybrid network; a transmit channel circuit connected between said transmitter and said telephone line; said receive and transmit channel circuits each including signal gain control means; loop current detection means included jointly in said hybrid network and said transmit channel circuit; a voltage follower including a control input connected to said loop current detection means, a connection to a source of DC potential and output circuit connections to said gain control means included in both said receive and transmit channel circuits; said loop current detection means operated in response to loop current in said transmit channel circuit and said hybrid network; said voltage follower in response to operation of said loop current detection means operated to extend said DC potential to said control means in proportion to the loop current in said transmit channel and said hybrid network to operate said gain control means proportionally to said loop current; whereby the amplitude of signals in said receive and transmit channel circuits is controlled in proportion to the loop current present in said telephone circuit and said telephone line.

2. A speech network for a telephone circuit as claimed in claim 1 wherein: each of said gain control means comprise a signal path through said respective channel circuits and connected in shunt relationship thereto, a capacitor and a diode connected in series; the junction point between said capacitor and said diode connected to said loop current detection means, whereby said diode functions as a variable resistance to vary the attenuation of signals passing through said signal path, in response to said loop current detection means.

3. A speech network for a telephone circuit as claimed in claim 1 wherein: said hybrid network is substantially non-reactive.

4. A speech network for a telephone circuit as claimed in claim 1 wherein: said gain control means included in both said receive and transmit channel circuits each further include frequency equalization means including circuit connections to said loop current detection means; said frequency equalization means operated proportionally in response to loop current in said transmit channel circuit.

5. A speech network for a telephone circuit as claimed in claim 4 wherein: said frequency equalization means each comprise a capacitor and diode connected in series as a shunt path to a signal path through each of said channel circuits, the junction point between said capacitor and said diode connected to said loop current detection means whereby said diode is operated as a variable resistance providing a variable shunt path proportional to signal current in said transmit channel circuit.

6. A speech network for a telephone circuit as claimed in claim 1 wherein: there is further included voice mode detection means connected to said transmit channel circuit and including circuit connections to said gain control means included in said receive and transmit channel circuits; said mode detection means operated in response to an output from said transmitter exceeding a predetermined level to operate said gain control means included in said receive channel circuit, to reduce the level of signals in said receive channel circuit, and operate said gain control means included in said transmit channel to increase the level of signals in said transmit channel circuit whereby proper side tone levels are maintained in said telephone circuit.

7. A speech network for a telephone circuit as claimed in claim 6 wherein: said voice mode detection means comprise an amplifier circuit connected to said transmit channel circuit; a switching circuit connected to said gain control means in both said receive and transmit channel circuits and a detector circuit connected between said amplifier and said switching means, operated in response to amplified output signals from said transmitter exceeding a predetermined level to operate said switch; said operated switch effective to operate said gain control means included in said receive and transmit channel circuits.

8. A speech network for a telephone circuit as claimed in claim 1 wherein: said receive channel circuit further includes a push-pull output amplifier having its output connected to said receiver and a second amplifier connected between said push-pull amplifier and said gain control means; said gain control means including input connections from said hybrid network.

9. A speech network for a telephone circuit as claimed in claim 8 wherein: said push-pull amplifier includes an output stage comprising a pair of transistors each connected to said receiver and each driven from said second amplifier in phase opposition.

10. A speech network for a telephone circuit as claimed in claim 1 wherein: said transmit channel circuit further includes a first amplifier connected to said transmitter, a second amplifier connected to said telephone line; said transmit gain control means connected between said first and second amplifiers; said loop current detection means included in said second amplifier, connected across said telephone line, said detector means including an input circuit connection from said first amplifier, a first output connection to said line and a second output connection to said hybrid and to both said signal gain control means.

11. A speech network for a telephone circuit as claimed in claim 10 wherein: said second amplifier includes impedance compensating means operated to compensate for deviations in the terminal impedance presented by said telephone circuit to said telephone line.

* * * * *